April 15, 1941. J. TITTEL 2,238,611
SELF-EXCITATION OF ALTERNATING CURRENT GENERATORS
Filed June 8, 1940 2 Sheets-Sheet 1
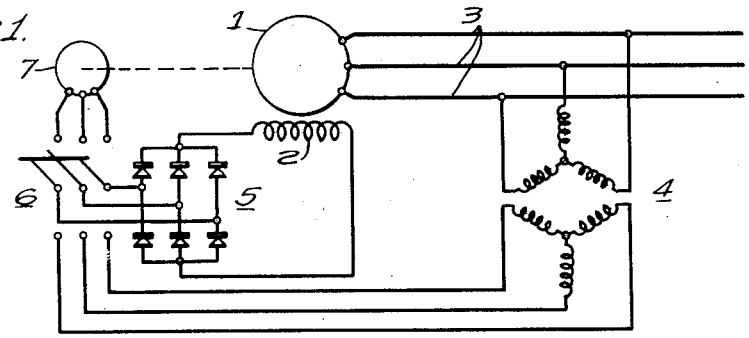
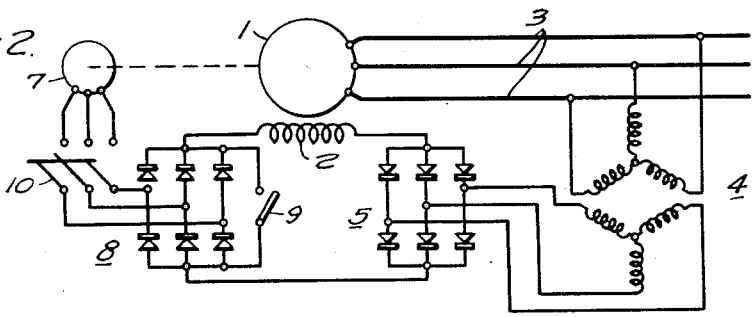
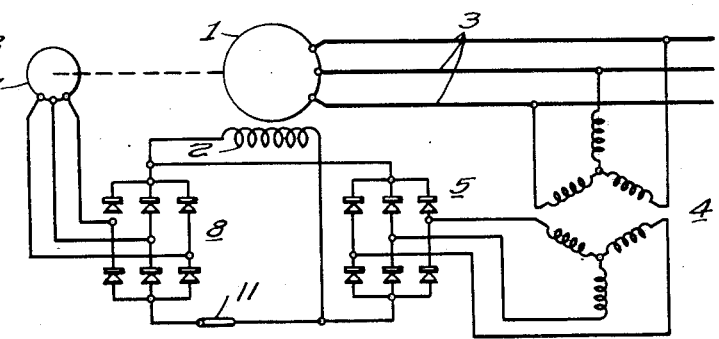
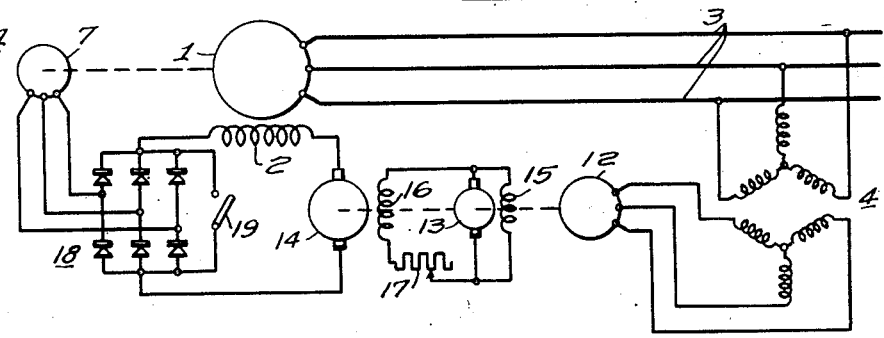
WITNESSES:
INVENTOR
Josef Tittel.
BY
ATTORNEY April 15, 1941.   J. TITTEL   2,238,611
SELF-EXCITATION OF ALTERNATING CURRENT GENERATORS
Filed June 8, 1940   2 Sheets-Sheet 2
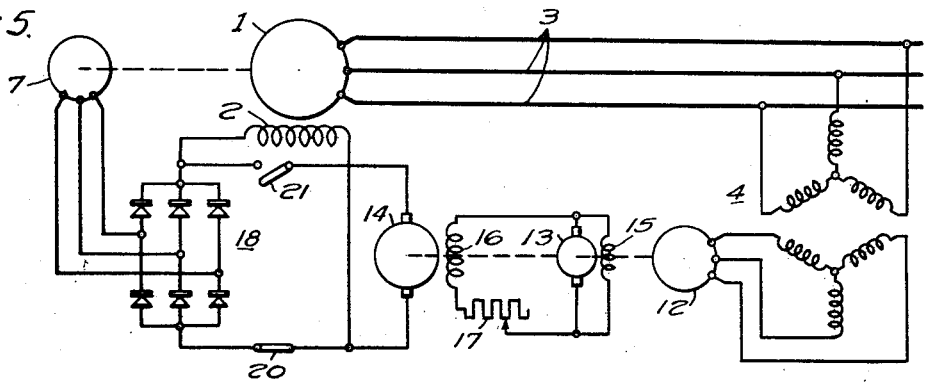
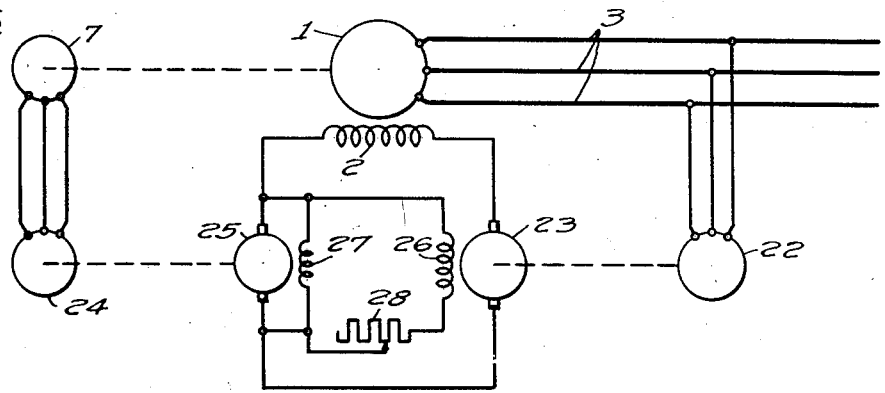
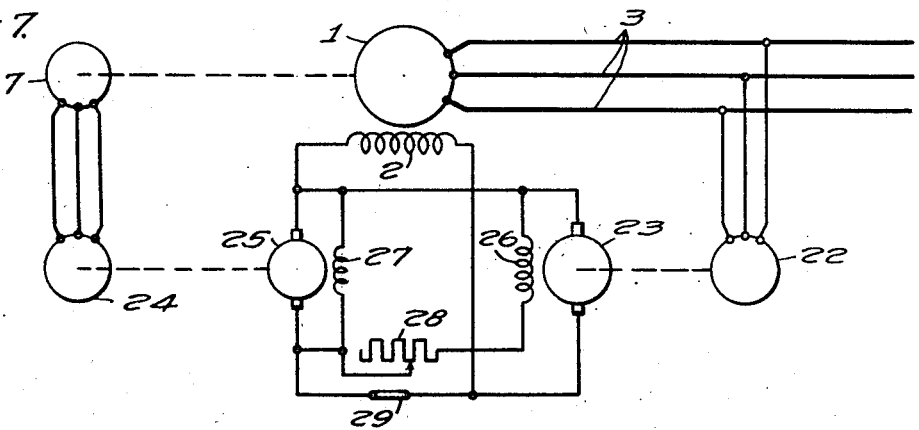
WITNESSES:
E. A. McCloskey.
Nw. C. Groome
INVENTOR
Josef Tittel.
BY O. B. Buchanan
ATTORNEY Patented Apr. 15, 1941

2,238,611

UNITED STATES PATENT OFFICE 2,238,611

SELF-EXCITATION OF ALTERNATING CURRENT GENERATORS

Josef Tittel, Berlin-Lubars, Germany, assignor to Westinghouse Electric & Manufacturing Company, East Pittsburgh, Pa., a corporation of Pennsylvania Application June 8, 1940, Serial No. 339,457
In Germany March 4, 1939

11 Claims. (Cl. 171—119)

The present invention relates to synchronous alternating-current generators, and more particularly to a system for self-excitation of such generators.

Synchronous generators require direct-current excitation to produce the necessary magnetic field in the machine and the excitation is usually supplied by a separate direct-current generator or exciter. In many cases, however, it would be desirable to make synchronous generators self-excited by supplying the exciting current from the generator itself through a rectifier or other suitable means for converting alternating current to direct current. When such a self-excited generator is being started, however, the generated voltage is produced by the residual magnetism of the field system since there is no initial exciting current and, especially in large machines, this voltage during the starting period is often not high enough to supply the necessary exciting current and the generator fails to build up its voltage.

Batteries have sometimes been used to supply the excitation during the starting period until the generator voltage has become high enough to make the machine self-exciting, but the use of batteries is not entirely satisfactory, since they require considerable maintenance and are relatively expensive. Batteries are also unsuitable for isolated or unattended stations where self-excitation would be especially desirable. It has also been proposed to initiate the self-excitation by loading the generator with capacitors during the starting period, but this expedient is undesirable since the capacitors must be of large capacity and they are, therefore, expensive and occupy considerable space.

The object of the present invention is to provide a system for self-excitation of synchronous generators which is independent of any external source of current and which will supply a large enough exciting current during the starting period to cause the generator to build up its voltage.

A further object of the invention is to provide a system of self-excitation of synchronous generators which is very reliable in operation and which requires relatively little maintenance and attention.

More specifically, the object of the invention is to provide a system for self-excitation of a synchronous generator in which a small auxiliary generator is driven by the main generator and is used to supply the exciting current during the starting period. The auxiliary generator is preferably a small synchronous machine of the type having a permanent magnet rotor and it may be mounted directly on the shaft of the main generator. The output of the auxiliary generator is converted to direct current either by a rectifier or by a small motor-generator set connected to the field winding of the main generator, either in series or in parallel with the main source of exciting current, and which may be removed from the circuit after the generator voltage has become high enough to make the machine self-exciting.

Other objects and advantages of the invention will be apparent from the following detailed description, taken in connection with the accompanying drawings, in which:

Figure 1 is a wiring diagram showing one embodiment of the invention; and

Figs. 2 to 7, inclusive, are similar diagrams showing other embodiments of the invention.

One embodiment of the invention in its simplest form is shown in Figure 1, which shows a system for the excitation of a synchronous generator 1 which has a direct-current field winding 2 and is connected to supply a three-phase line 3. The main exciting current for the generator 1 is supplied from the line 3 through a three-phase transformer 4 and a rectifier 5 of any suitable type which is connected in series with the field winding 2. The transformer 4 is preferably connected to the rectifier 5 by a double-throw switch 6.

As explained above, when the generator is being started, its voltage is produced by the residual magnetism of the field system, and this voltage may not be high enough to cause the necessary exciting current to flow through the rectifier 5 and field winding 2, so that the generator 1 will not build up its voltage. In order to overcome this difficulty and supply sufficient excitation during the starting period, a small auxiliary generator 7 is provided which is connected to the rectifier 5 by means of the switch 6 during the starting period. The auxiliary generator 7 is preferably a small synchronous machine of the type having a permanent magnet rotor, since machines of this type are simple and inexpensive in construction and reliable in operation, and as they have no slip rings or brushes, they require little attention. The generator 7 may be driven from the main generator 1 in any suitable manner, but it is preferably mounted directly on the shaft of the generator. When the generator 1 is being started, the auxiliary generator 7 is connected to the rectifier 5 by means of the switch 6, so that it supplies current to the field winding 2. After the generator voltage has built up to a high enough value to make the machine self-exciting, the transformer 4 is connected to the rectifier 5 by means of the switch 6 and the auxiliary generator 7 is disconnected. If desired, the generator 7 may also be used as an auxiliary voltage source for supplying other devices associated with the generator 1, such as a voltage regulator. It will be seen that this system is very simple and reliable, and that it is independent of any external source of current. For this reason, and also because of the small space requirements and low cost, and the fact that little or no attention is necessary, this system is greatly superior to the use of batteries for supplying the initial excitation.

Fig. 2 shows another embodiment of the invention which is more suitable for machines of large capacity. In this figure, the field winding 2 of the generator 1 is supplied from a rectifier 5 which is energized from the line 3 through a transformer 4 in the same manner as in Fig. 1. The rectifier 5 may be of the dry type, such as a copper-oxide rectifier, or it may be of the discharge or electronic type. The auxiliary generator 7 is connected to a smaller rectifier 8 which is connected in series with the field winding 2 and the rectifier 5 during the starting period. When the generator 1 is being started, the auxiliary generator 7 supplies the necessary exciting current to the field winding 2 through the rectifier 8, and this rectifier also serves to supply the necessary starting voltage to the rectifier 5 in case the latter is of a type which requires a definite starting potential. When the voltage of the generator 1 has built up to a high enough value to be self-exciting through the transformer 4 and rectifier 5, the rectifier 8 is removed from the circuit by short-circuiting it with the switch 9, since the small rectifier 8 is not of great enough capacity to carry the full exciting current of the generator 1. The auxiliary generator 7 may also be disconnected from the rectifier 8 by means of a switch 10. This embodiment of the invention is particularly suitable for large machines requiring relatively high exciting currents, since a relatively small rectifier 8 may be used to supply the initial exciting current and it may also be used to furnish the necessary starting potential for the larger rectifier 5 which supplies the exciting current after the main generator voltage has built up to a high enough value.

Fig. 3 shows a system which is similar to that of Fig. 2 except that the two rectifiers are connected to the field winding 2 in parallel rather than in series. Thus, as shown in the drawing, the rectifiers 5 and 8 are connected together in such a manner that currents passing through them oppose each other, and they are connected to the field winding 2 so that the currents from both rectifiers flow through the winding in the same direction. When the generator 1 is being started, its field current is supplied by the rectifier 8, but when the generator voltage has built up high enough for the generator to become self-exciting, the voltage across the rectifier 5 becomes greater than that across the rectifier 8 and no current will then flow through the latter rectifier, which may be disconnected from the circuit by opening the switch 11. The field current for the generator 1 is then supplied through the transformer 4 and rectifier 5.

Fig. 4 shows an embodiment of the invention in which the excitation is supplied from the line 3 by means of a motor-generator set instead of a rectifier. In this embodiment of the invention, the transformer 4 is connected to a motor 12 which drives a small exciter 13 and a direct-current generator 14. The exciter 13 supplies the field winding 15 of the motor 12 and the field winding 16 of the generator 14. A field rheostat 17 is connected in series with the field winding 16 to control the voltage of the generator 14 and, therefore, the magnitude of the exciting current. The generator 14 is connected to the field winding 2 of the main generator 1 in series with the rectifier 18 which is energized by the auxiliary synchronous generator 7. When the generator 1 is being started, the auxiliary generator 7 supplies the necessary initial exciting current through the rectifier 18. When the voltage of the generator 1 has built up to a high enough value, the motor 12 will start and drive the generator 14 which then supplies the field current to the winding 2. The rectifier 18 is then removed from the circuit by short-circuiting it by means of the switch 19, so that it does not need to have sufficient capacity to carry the full exciting current of the generator.

Fig. 5 shows an arrangement which is similar to that of Fig. 4 except that the direct-current generator 14 and the rectifier 18 are connected to the field winding 2 in parallel instead of in series. The operation of this system is essentially the same as that of Fig. 4, and after the motor 12 has started and the generator 14 is supplying the excitation, the rectifier 1 is disconnected from the circuit by opening the switch 20. If desired, a switch 21 may be provided for disconnecting the generator 14 from the field winding until its voltage is high enough to supply the necessary exciting current, when the switch 21 can be closed and the switch 20 opened.

In Fig. 6 there is shown a system in which both the initial excitation and the full exciting current are supplied by motor-generator sets. In this arrangement, a motor 22 is energized from the line 3, either directly or through transformers, and drives a direct-current generator 23. Similarly, the auxiliary synchronous generator 7 is connected to a motor 24 which drives a small direct-current generator 25. The generators 23 and 25 are connected in series to the field winding 2 of the main generator 1. The field winding 26 of the generator 23 and the field winding 27 of the generator 25 are connected in parallel across the terminals of the generator 25 so that this generator is self-excited and also serves as an exciter for the generator 23. A field rheostat 28 may be connected in series with the field winding 26 to control the voltage of the generator 23 and thus the magnitude of the field current for the main generator 1.

In the operation of this system, when the generator 1 is started, the auxiliary generator 7, which is driven from the generator 1, energizes the motor 24 so that it starts and drives the generator 25 which supplies the necessary initial exciting current in the field winding 2 to cause the voltage of the generator 1 to start building up. The voltage of the generator 25 is applied across the field winding 2 and generator 23 in series, and since the voltage applied to the motor 22 at this time is not high enough to cause it to rotate, the generator 23 will tend to run as a motor. This effect facilitates the starting of the motor 22 when the voltage of the generator 1 reaches a high enough value, and when the motor 22 has come up to speed, the machine 23 runs as a generator and supplies the exciting current for the field winding 2. The generator 25 then functions as an exciter for the field winding 26 of the machine 23.

Fig. 7 shows an arrangement which is similar to that of Fig. 6 except that the generators 23 and 25 are connected to the field winding 2 in parallel instead of in series. The field windings 26 and 27 of the machines 23 and 25, respectively, are connected in parallel across the terminals of the generator 25, and a switch 29 is provided to disconnect the generator 25 from the winding 2 after the generator 23 has started to supply the exciting current. It will be seen that when this switch is open, the generator 23 only is connected to the winding 2, but the generator 25 is still connected to the field windings 26 and 27 so that it functions as an exciter for the machine 23. The operation of this embodiment of the invention is the same as that described above in connection with Fig. 6.

It should now be apparent that a system of self-excitation for a synchronous generator has been provided which is relatively simple and which is very reliable in operation. This system requires no external source of current since the necessary initial excitation is supplied by the auxiliary generator 7 which may be very small and may be mounted directly on the shaft of the main generator, while the necessary rectifiers or auxiliary motors and generators may be relatively small. It is to be understood that the invention is capable of numerous other embodiments without departing from the underlying principles disclosed above, and that although certain specific embodiments of the invention have been illustrated and described, it is not limited to the exact arrangements shown, but in its broadest aspects, it includes all equivalent embodiments and modifications which come within the scope of the appended claims.

I claim as my invention:

1. A system for self-excitation of an alternating current generator having a direct-current field winding comprising means energized from the generator for supplying direct current excitation to the field winding, and auxiliary means mechanically driven by the generator for supplying excitation to the field winding during the starting period.

2. A system for self-excitation of an alternating current generator having a direct-current field winding comprising means energized from the generator for supplying direct-current excitation to the field winding, and an auxiliary generator driven by the first mentioned generator for supplying excitation to the field winding during the starting period.

3. A system for self-excitation of an alternating current generator having a direct-current field winding comprising means energized from the generator for supplying direct-current excitation to the field winding, an auxiliary synchronous generator driven by the first mentioned generator, and means for converting the output of said auxiliary generator to direct current for exciting said field winding during the starting period while the voltage of the first mentioned generator is building up.

4. A system for self-excitation of an alternating current generator having a direct-current field winding comprising means energized from the generator for supplying direct-current excitation to the field winding, an auxiliary synchronous generator driven by the first mentioned generator, said auxiliary generator having a permanent magnet rotor, and means for converting the output of said auxiliary generator to direct current for exciting said field winding during the starting period while the voltage of the first mentioned generator is building up.

5. A system for self-excitation of an alternating current generator having a direct-current field winding comprising means energized from the generator for supplying direct-current excitation to the field winding, an auxiliary synchronous generator driven by the first mentioned generator, and rectifier means for converting the output of said auxiliary generator to direct current, said rectifier means being connected to said field winding for exciting it during the starting period.

6. A system for self-excitation of an alternating current generator having a direct current field winding comprising means energized from the generator for supplying direct-current excitation to the field winding, an auxiliary synchronous generator driven by the first mentioned generator, rectifier means for converting the output of said auxiliary generator to direct current, said rectifier means being connected to said field winding for exciting it during the starting period, and means for disconnecting the rectifier means from the field winding.

7. A system for self-excitation of an alternating current generator having a direct-current field winding comprising means energized from the generator for supplying direct-current excitation to the field winding, an auxiliary synchronous generator driven by the first mentioned generator, said auxiliary generator having a permanent magnet rotor, rectifier means for converting the output of said auxiliary generator to direct current, said rectifier means being connected to said field winding for exciting it during the starting period, and means for disconnecting the rectifier means from the field winding.

8. A system for self-excitation of an alternating current generator having a direct current field winding comprising means energized from the generator for supplying direct-current excitation to the field winding, an auxiliary synchronous generator driven by the first mentioned generator, a motor energized by said auxiliary generator, and a direct-current generator driven by said motor and connected to said field winding to supply excitation during the starting period.

9. A system for self-excitation of an alternating current generator having a direct-current field winding comprising a direct-current generator connected to the field winding, means energized from the first mentioned generator for driving the direct-current generator, an auxiliary synchronous generator driven by the first mentioned generator, and means for converting the output of said auxiliary generator to direct current, said last mentioned means being also connected to the field winding to supply excitation during the starting period.

10. A system for self-excitation of an alternating-current generator having a direct-current field winding comprising a direct-current generator connected to the field winding, means energized from the first mentioned generator for driving the direct current generator, an auxiliary synchronous generator driven by the first mentioned generator, a second direct-current generator connected to the field winding to supply excitation during the starting period, and means energized from said auxiliary generator for driving said second direct-current generator.

11. A system for self-excitation of an alternating-current generator having a direct-current field winding comprising a direct-current generator connected to the field winding, means energized from the first mentioned generator for driving the direct-current generator, an auxiliary synchronous generator driven by the first mentioned generator, a second direct-current generator connected to the field winding to supply excitation during the starting period, and means energized from said auxiliary generator for driving said second direct-current generator, the second direct current generator being also connected to supply excitation for the first direct-current generator.

JOSEF TITTEL.